United States Patent
Chang et al.

(10) Patent No.: US 8,089,480 B2
(45) Date of Patent: Jan. 3, 2012

(54) METHOD FOR MESHING A CURVED SURFACE

(75) Inventors: Chih-Kuang Chang, Taipei Hsien (TW); Xin-Yuan Wu, Shenzhen (CN); Min Wang, Shenzhen (CN)

(73) Assignees: Hong Fu Jin Precision Industry (ShenZhen) Co., Ltd., Shenzhen City, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 818 days.

(21) Appl. No.: 12/187,401

(22) Filed: Aug. 7, 2008

(65) Prior Publication Data

US 2009/0058853 A1    Mar. 5, 2009

(30) Foreign Application Priority Data

Sep. 3, 2007  (CN) .......................... 2007 1 0201590

(51) Int. Cl.
*G06T 15/00* (2011.01)
*G06T 15/30* (2011.01)
*G06T 15/10* (2011.01)
*G06T 17/00* (2006.01)
*G06K 9/00* (2006.01)
*G06F 17/50* (2006.01)
*G06F 7/60* (2006.01)

(52) U.S. Cl. ........ 345/423; 345/419; 345/420; 345/427; 703/1; 703/2; 382/154

(58) Field of Classification Search ........................ None
See application file for complete search history.

(56) References Cited

U.S. PATENT DOCUMENTS

| | | | | |
|---|---|---|---|---|
| 6,285,372 B1 * | 9/2001 | Cowsar et al. | ................ | 345/420 |
| 7,408,548 B2 * | 8/2008 | Guenter et al. | ............... | 345/420 |
| 2006/0290695 A1 * | 12/2006 | Salomie | ........................ | 345/420 |

* cited by examiner

*Primary Examiner* — Tize Ma
(74) *Attorney, Agent, or Firm* — Altis Law Group, Inc.

(57) ABSTRACT

A curved surface meshing method is provided. The method meshes a three-dimensional curved surface by meshing a parameter plane, mapping triangles generated on the parameter plane to triangles in a three-dimensional space to get a 3D meshed curved surface. The method may generate substantially well-proportional distributed triangles on curved surfaces of three-dimensional models of objects.

16 Claims, 15 Drawing Sheets

METHOD FOR MESHING A CURVED SURFACE

BACKGROUND

1. Field of the Invention

Embodiments of the present disclosure relates to computer aided design (CAD), and more particularly, to a curved surface meshing method during reverse engineering processes.

2. Description of Related Art

A three-dimensional (3D) scanner captures geometric information of a 3D object by gathering high resolution points representing the shape of the 3D object. Once captured, raw 3D scan data may be converted to a CAD model for further processing to replicate or modify a design of the 3D object in a process referred to as reverse engineering.

Generally speaking, a 3D model of an object may be represented by a plurality of freeform curved surfaces. The curved surfaces may be represented by either a plurality of points or dense triangular (or other shaped) meshes which cumulatively form outlines of the 3D object. At present, an iterative algorithm is widely used for constructing triangular meshes. However, triangles fitted via the iterative algorithm are variform and the fitting speed is very slow. Another popular triangulation method is the Delaunay algorithm, which focuses on improving surface dividing quality. Triangles fitted via the Delaunay algorithm are well-proportioned; however, a huge amount of triangles are produced by this method, which requires a great deal of time.

What is needed, therefore, is a curved surface meshing method, which can construct an appropriate amount of well-proportioned triangle meshes quickly based on user demands, so as to improve the speed and precision of curved surface triangulation.

SUMMARY

In one aspect, a computer-based method for meshing a curved surface of an object is provided. The method meshes a three-dimensional curved surface by meshing a parameter plane, mapping triangles generated on the parameter plane to triangles in a three-dimensional space to get a 3D meshed curved surface. The method may generate substantially well-proportional distributed triangles on curved surfaces of three-dimensional models of objects.

Other objects, advantages and novel features of the present invention will become more apparent from the following detailed description of certain embodiments of the present disclosure when taken in conjunction with the accompanying drawings, in which:

DETAILED DESCRIPTION OF CERTAIN INVENTIVE EMBODIMENTS

All of the processes described below may be embodied in, and fully automated via, software code modules executed by one or more general purpose computers or processors. The code modules may be stored in any type of computer-readable medium or other computer storage device. Some or all of the methods may alternatively be embodied in specialized computer hardware.

Figure 1:
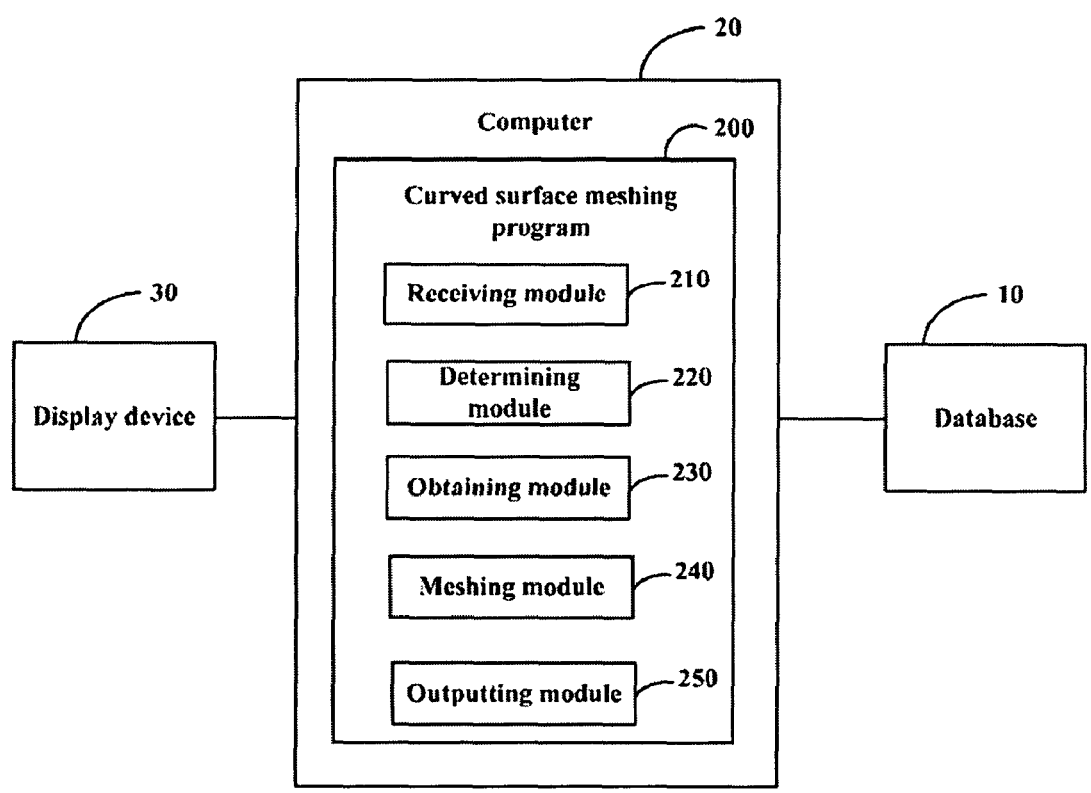
FIG. 1 is a block diagram of one embodiment of a system for meshing a curved surface of an object of the present disclosure.
Figure 8:
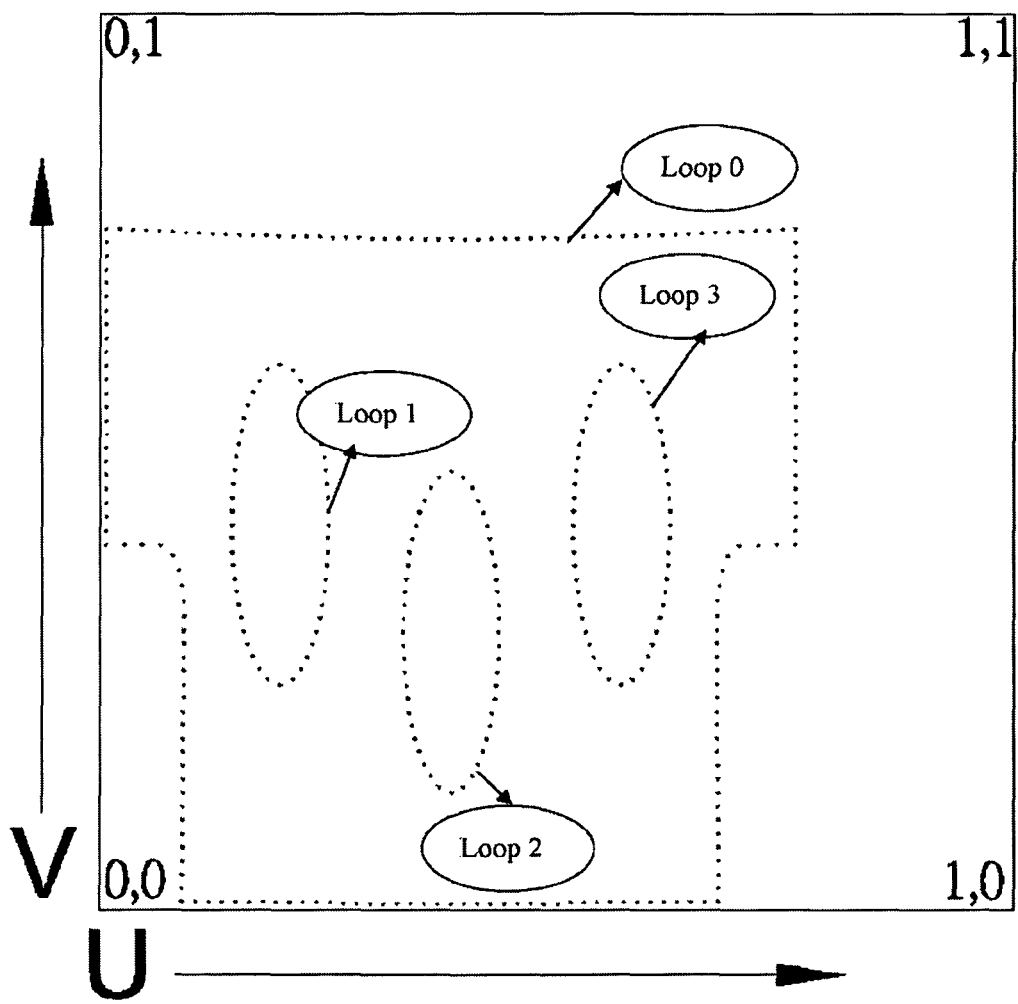
FIG. 8 illustrates planar loops on a parameter plane that correspond to loops on the curved surface.

FIG. 1 is a block diagram of one embodiment of a system for meshing a curved surface of an object of the present disclosure. The system includes a database 10, a computer 20, and a display device 30. The database 10 is connected to the computer 20 and is configured for storing information about curved surfaces, such as a parametric equation (i.e., $x=j(u, v)$, $y=\psi(u, v)$, $z=c(u, v)$) and a three-dimensional (3D) model of each of the curved surfaces. The database 10 is further configured for storing information generated based on the parametric equation for each of the curved surfaces, such as an area of each of the curved surfaces, a mapping relationship of 3D points on each of the curved surfaces and two-dimensional (2D) points in a parameter plane, a parametric equation (i.e. $x=j(u,v)$, $y=\psi(u,v)$, $0<u,v<=1$) and a perimeter of each of the loops on the curved surfaces. In this embodiment, the U-axis represents a horizontal direction, and the V-axis represents a vertical direction on the parameter plane (as shown in FIG. 8).

The display device 30 provides an interface for users to input information and display various information, such as the curved surfaces.

The computer 20 includes a curved surface meshing program 200. In one embodiment, the curved surface meshing program 200 includes a receiving module 210, a determining module 220, an obtaining module 230, a meshing module 240, and an outputting module 250.

Figure 7:
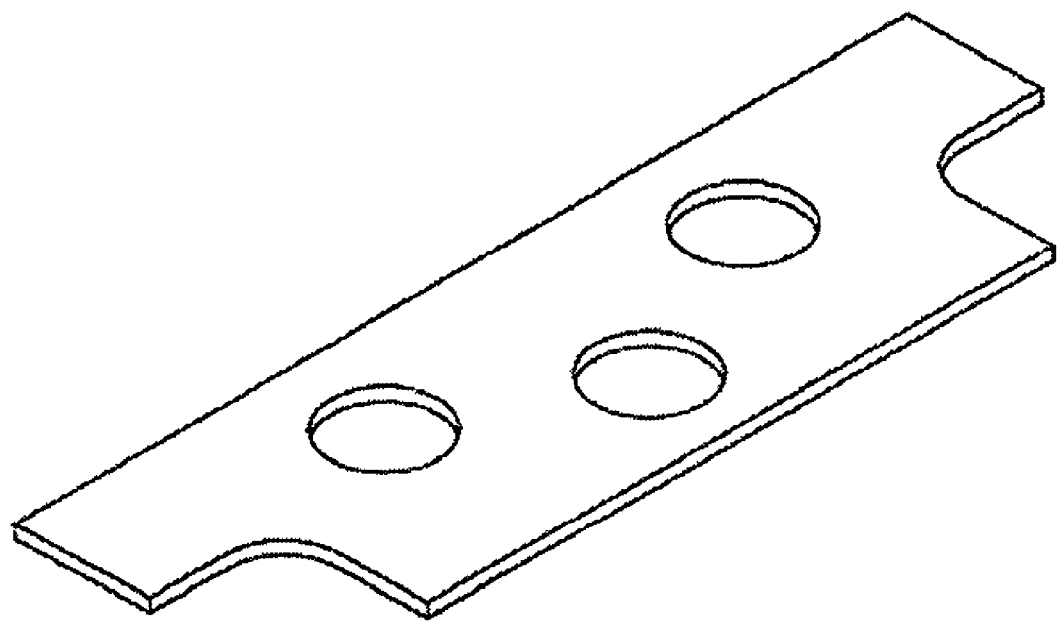
FIG. 7 illustrates a three-dimensional curved surface.

The receiving module 210 is configured for receiving information about a curved surface ( i.e., a parametric equation of the curved surface as shown in FIG. 7), and receiving relevant information defined by users, such as a designated number of vertices there should be on the curved surface after triangulation.

The determining module 220 is configured for determining an area of the curved surface according to the parametric equation of the curved surface, and determining step-lengths along the U direction and the V direction on the parameter plane according to the parametric equation of the curved surface and the designated number of vertices.

The determining module 220 is further configured for determining a perimeter of each loop on the curved surface according to a parametric equation of the loop. Additionally, the determining module 220 is configured for determining a number of vertices on each loop and U, V coordinates of each of the vertices, according to the perimeter, the parametric equation of the loop, and the step-lengths along the U direction and the V direction.

The obtaining module 230 is configured for obtaining the U, V coordinates of the vertices on each loop on the curved surface.

Figure 9:
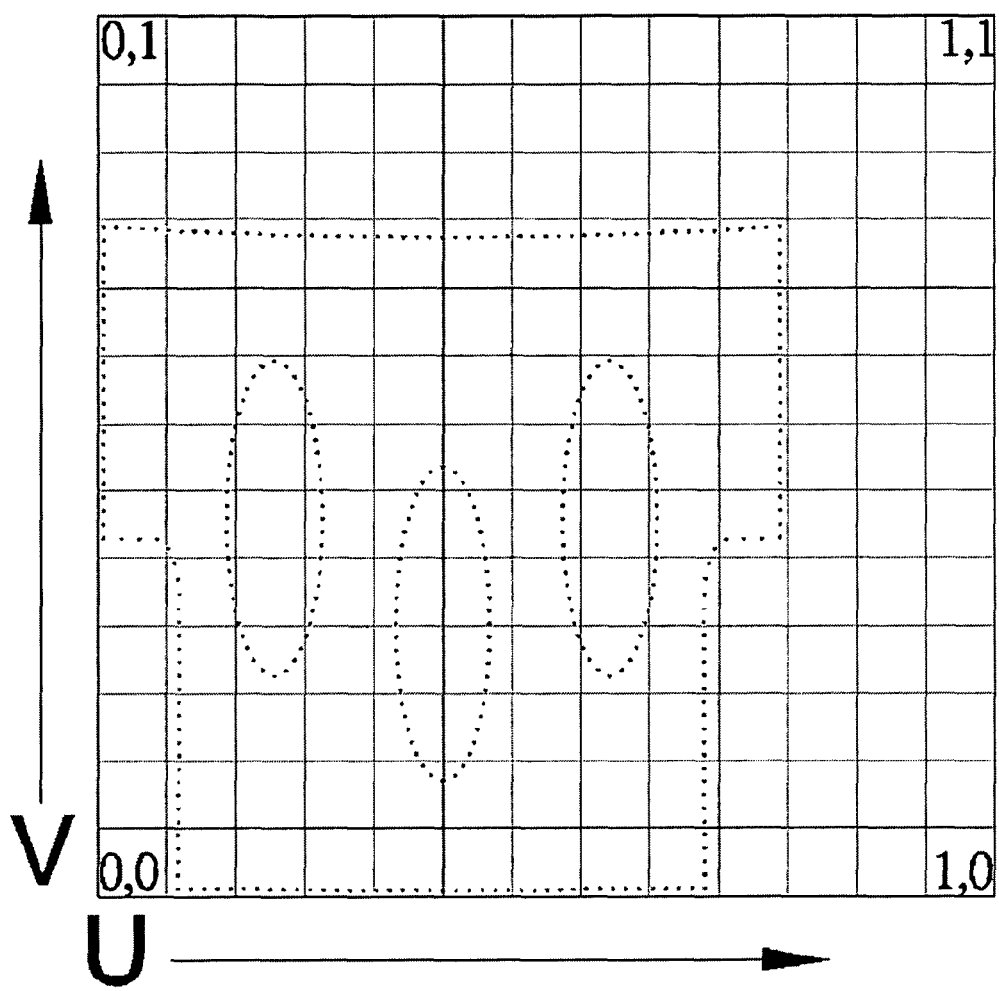
FIG. 9 illustrates the parameter plane, the planar loops, and U/V-lines for dividing a minimal bounding box of a maximal planar loop into a plurality of small boxes.

The meshing module 240 is configured for generating a planar loop corresponding to each loop on the curved surface by connecting 2D points corresponding to the U, V coordinates of the vertices on the parameter plane (as shown in FIG. 8). The meshing module 240 is also configured for dividing a minimal bounding box of a maximal planar loop on the parameter plane into a plurality of small boxes via U-lines and V-lines (as shown in FIG. 9), according to the step-lengths along the U direction and the V direction.

Figure 10:
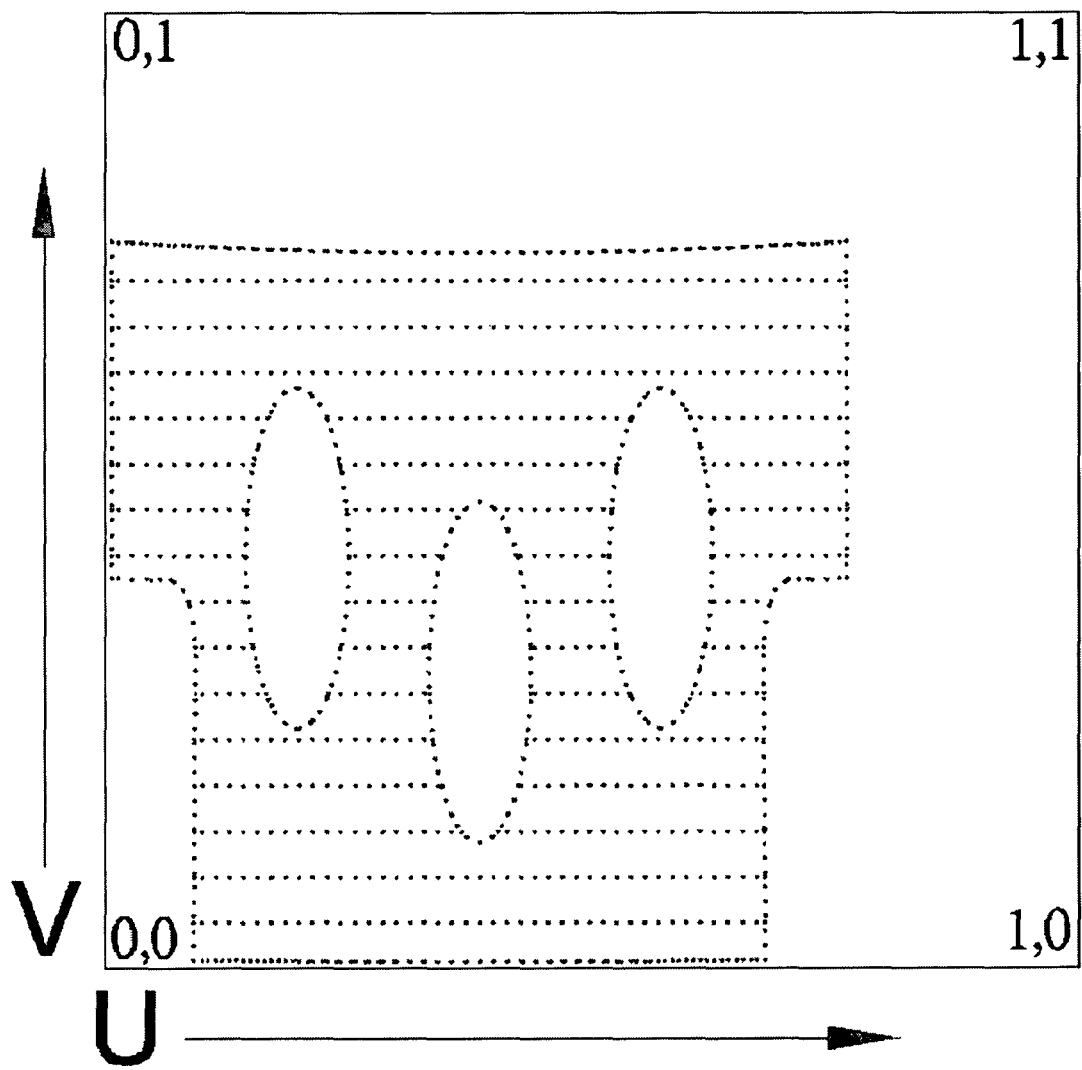
FIG. 10 illustrates determined effective points on the parameter plane, including intersection points of the U/V-lines and the planar loops on the parameter plane, vertices on the planar loops, and vertices on the small boxes located among planar loops.

Furthermore, the obtaining module 230 is configured for determining effective points, including intersection points of the U-lines or V-lines with the planar loops, determining vertices on the planar loops and vertices on the small boxes located among the planar loops (as shown in FIG. 10).

Figure 13:
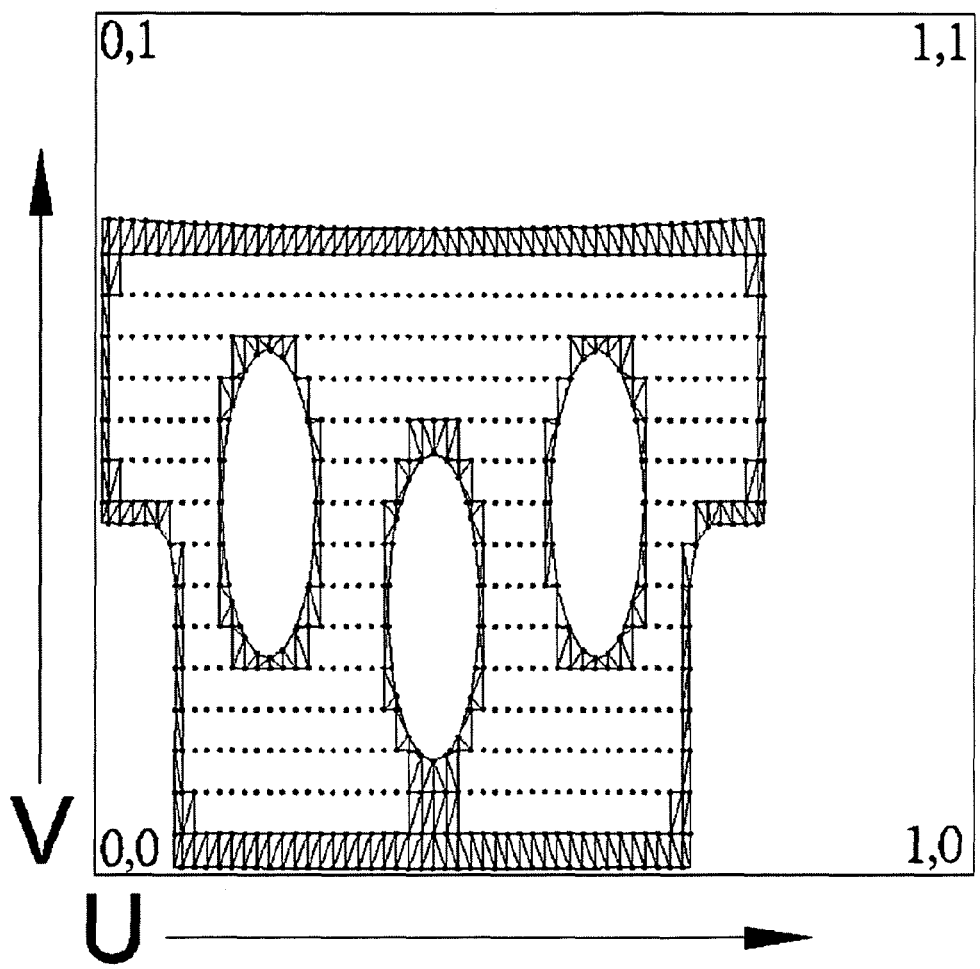
FIG. 13 and FIG. 14 illustrate triangles generated by connecting the effective points on the parameter plane.
Figure 14:
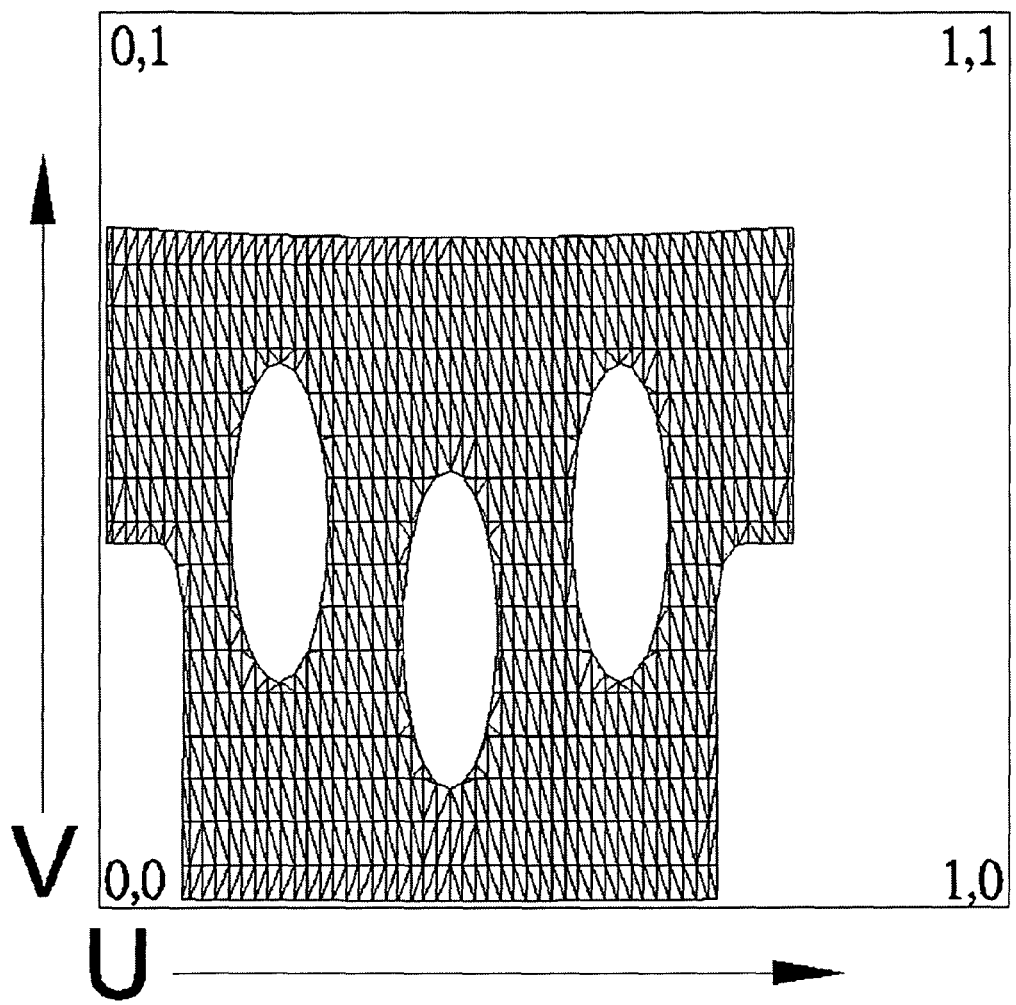

Moreover, the meshing module 240 is configured for generating triangles by connecting the effective points, including the intersection points, the vertices on the planar loops and the vertices of the small boxes located among the planar loops, and adjusting vector correlations of vertices on each triangle to be anti-clockwise (as shown in FIG. 13 and FIG. 14).

Moreover, the determining module 220 is configured for mapping the vertices on the triangles having U, V coordinates to 3D vertices having X,Y,Z coordinates, according to the parametric equation of the curved surface, and determining normal vectors of each of the triangles according to the X, Y, Z coordinates of the 3D vertices on each of the triangles.

Figure 15:
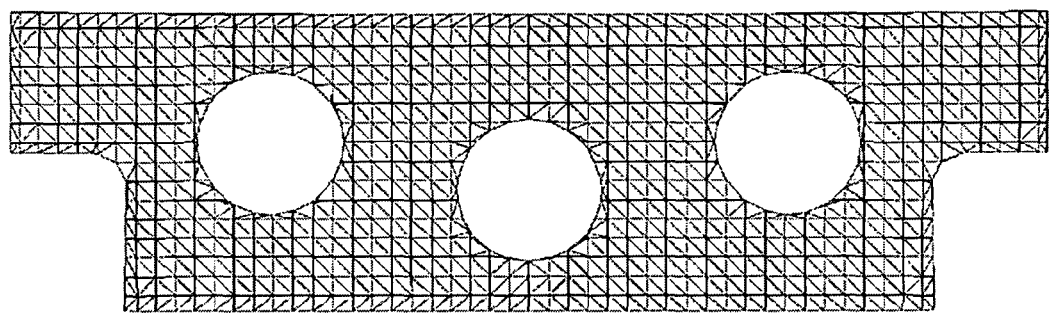
FIG. 15 illustrates a well-proportioned triangulated 3D model of the curved surface in FIG. 7 by mapping all the triangles on the parameter plane shown in FIG. 14 to a 3D coordinate system.

The outputting module 250 is configured for outputting a triangulated curved surface via the display device 30, according to the normal vectors, the X, Y, Z coordinates of the 3D vertices, and the vector correlations of the 3D vertices on each of the triangles (as shown in FIG. 15).

Figure 2:
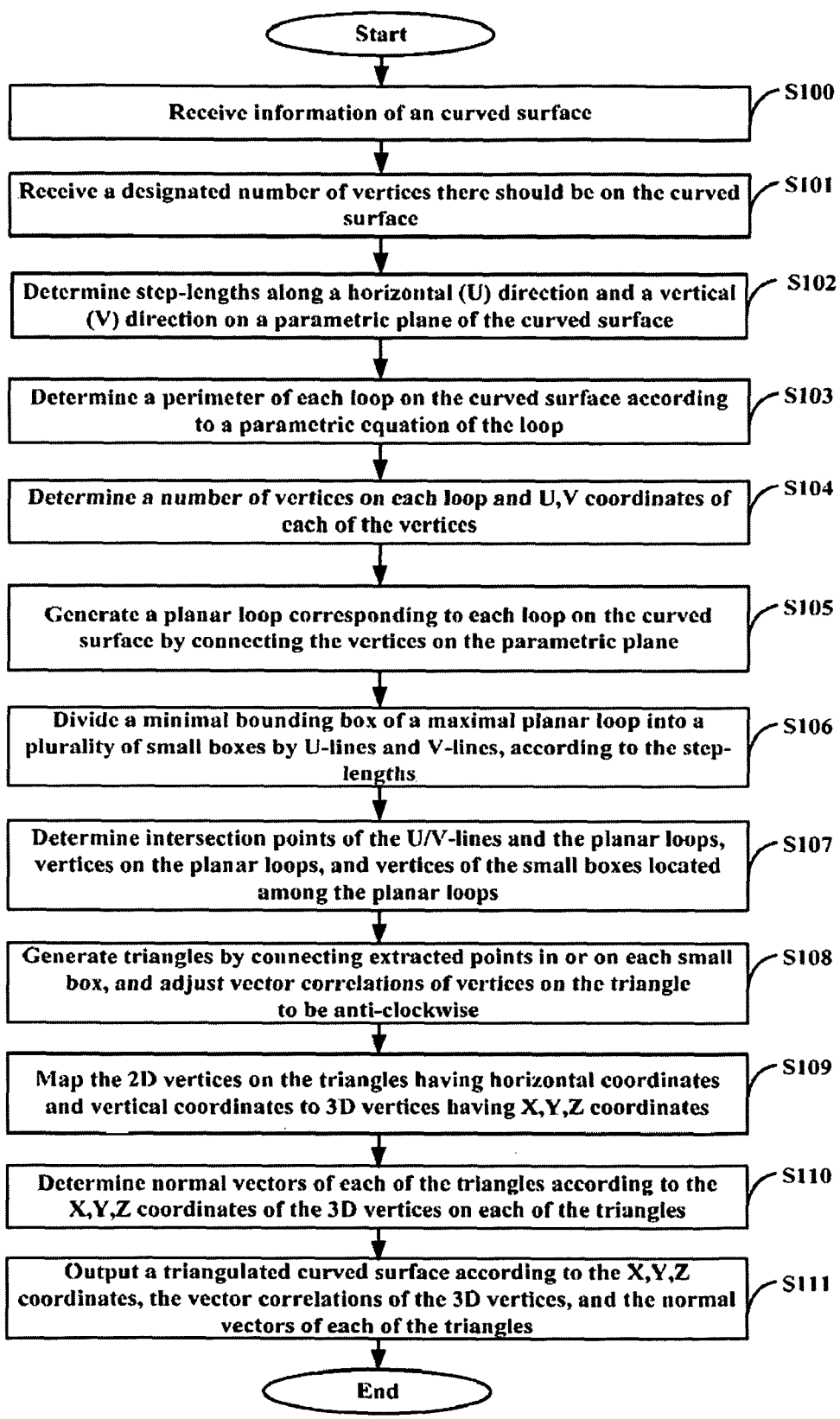
FIG. 2 is a flowchart of one embodiment of a method for meshing a curved surface.

FIG. 2 is a flowchart of one embodiment of a method for meshing a curved surface of an object of the present disclosure. Depending on the embodiment, additional blocks may be added, others removed, and the ordering of the blocks may be changed.

In block S100, the receiving module 210 receives information regarding a curved surface of an object from the database 10. The information includes a parametric equation of the curved surface as shown in FIG. 7. In block S101, the receiving module 210 receives predetermined information, such as a designated number of the vertices (such as number N) there should be on the curved surface after triangulation. It may be understood that the predetermined may be defined by a user via the interface provided by the display device 30.

Figure 3:
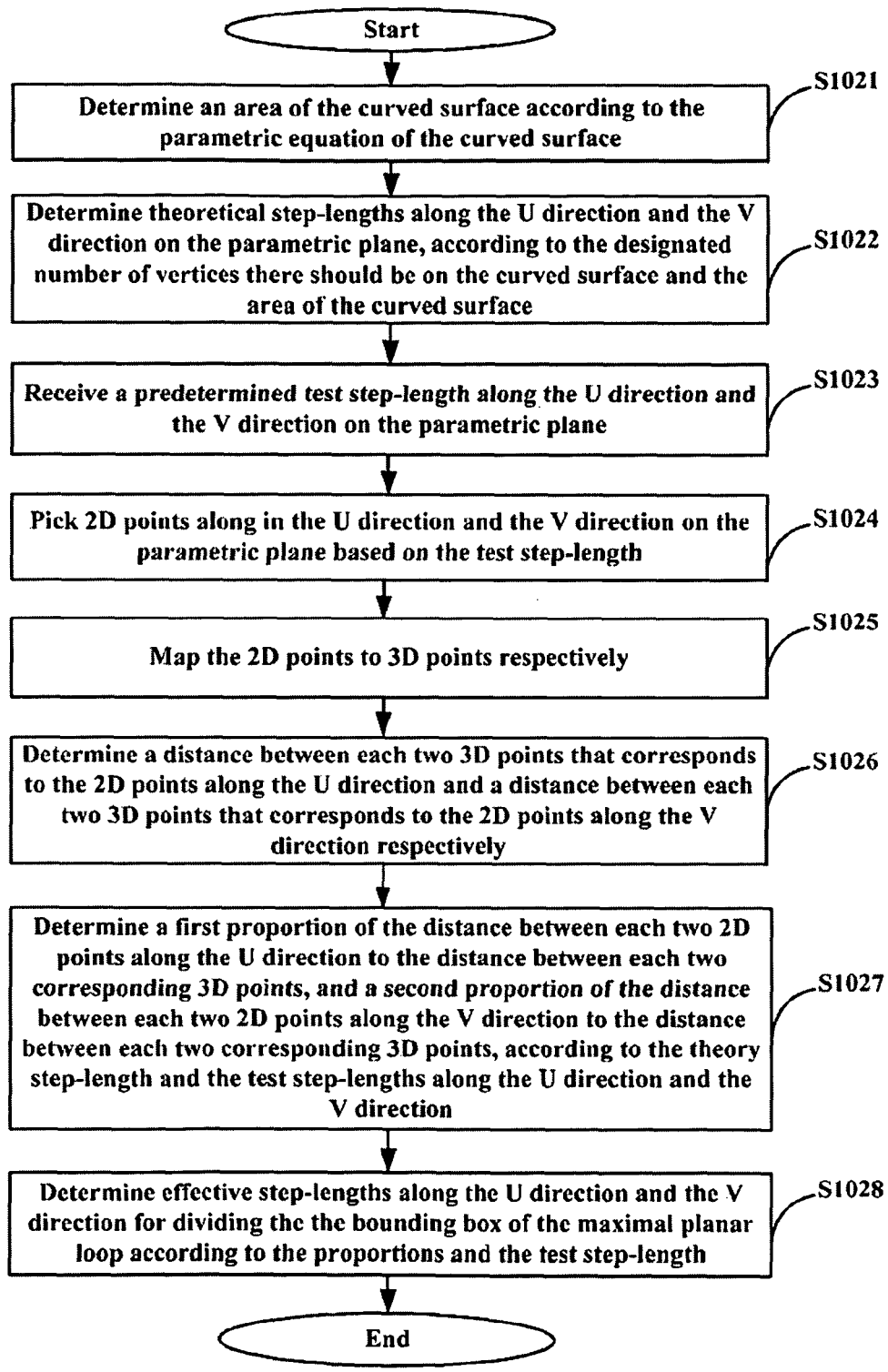
FIG. 3 is a detailed description of one block in FIG. 1, namely determining step-lengths along a U direction and a V direction on the parameter plane.

In block S102, the determining module 220 determines the step-lengths along a U direction and a V direction of the parameter plane of the curved surface, according to the parametric equation of the curved surface and the predetermined information (detailed description of this block is given in FIG. 3). In block S103, the determining module 220 determines a perimeter of each loop on the curved surface according to the parametric equation of the each of the loops.

Figure 4:
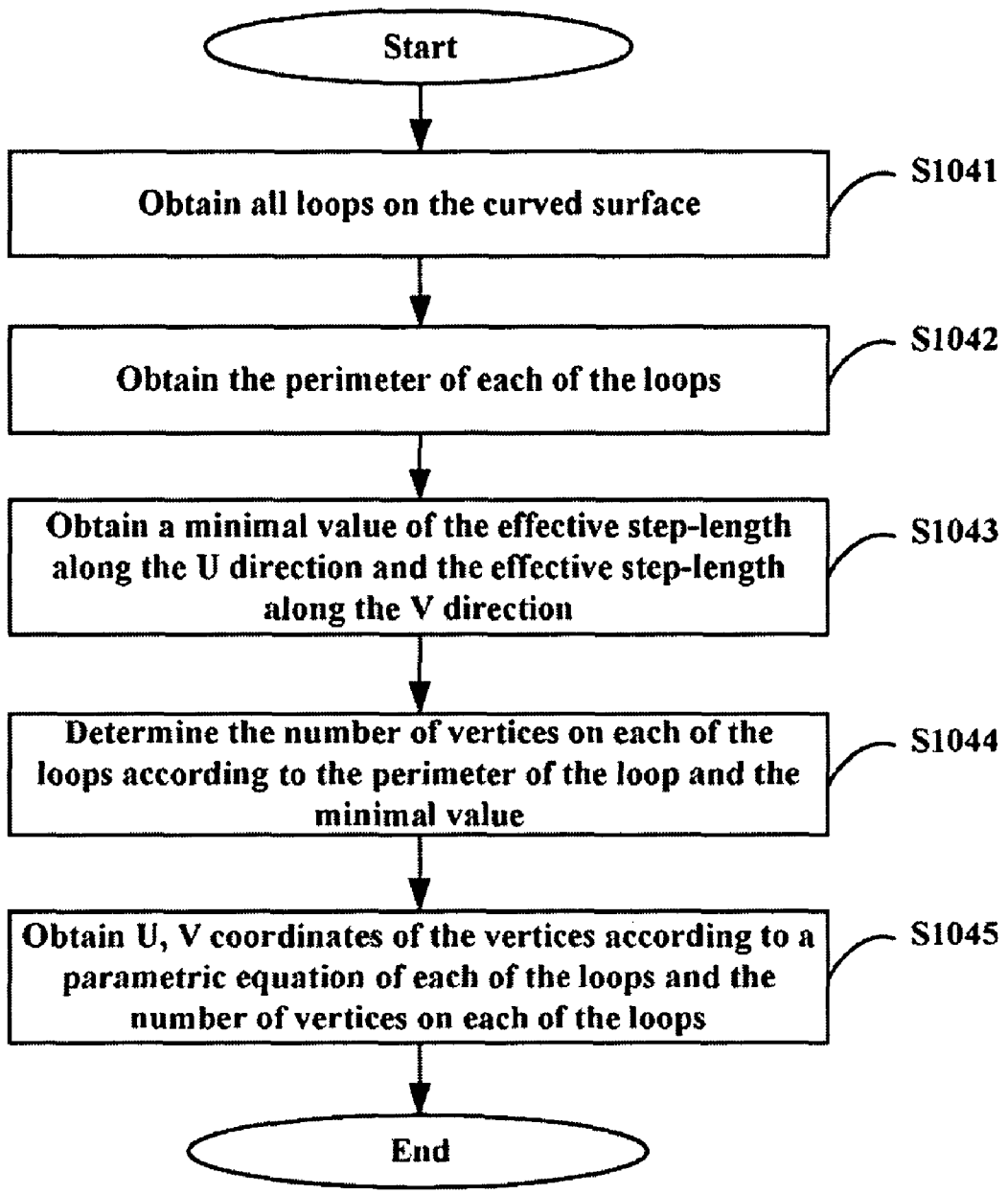
FIG. 4 is a detailed description of another block in FIG. 1, namely determining a number of vertices on each loop and U, V coordinates of these vertices.

In block S104, the determining module 220 determines a number of vertices on each loop, and U, V coordinates of these vertices on the parameter plane, according to the perimeter, the parametric equation of the loop, and the step-lengths along the U direction and the V direction (detailed description of this block is given in FIG. 4). In block S105, the meshing module 240 generates the planar loop corresponding to each loop on the curved surface by connecting 2D points corresponding to the U, V coordinates of these vertices on the parameter plane (as shown in FIG. 8).

In block S106, the meshing module 240 divides a minimal bounding box of a maximal planar loop into a plurality of small boxes via U-lines and V-lines, according to the step-lengths along the U direction and the V direction. As shown in FIG. 9, in this embodiment, the minimal bounding box of the maximal planar loop is the parameter plane. In block S107, the obtaining module 230 extracts intersection points of the U/V-lines with the planar loops (detailed description is given in FIG. 5), extracts the vertices on the planar loops, and the vertices on the small boxes located among the planar loops (as shown in FIG. 10). For simplification, hereinafter "the vertices on the small boxes located among the planar loops" are called "interior points", the intersection points, the vertices on the planar loops, and the interior points are called "effective points". In block S108, the meshing module 240 generates triangles by connecting the effective points in or on each small box, and adjusts the vector correlations of the vertices on the triangle to be anti-clockwise (as shown in FIG. 13 and FIG. 14) (detailed description of this block is given in FIG. 6).

In block S109, the determining module 210 maps the vertices on the triangles having U, V coordinates to 3D vertices having X,Y,Z coordinates, according to the parametric equation of the curved surface. In block S110, the determining module 210 determines the normal vectors of each of the triangles according to the X, Y, Z coordinates of the 3D vertices on each of the triangles. In block S111, the outputting module 250 outputs the triangulated curved surface via the interface provided by the display device 30, according to the X, Y, Z coordinates, the vector correlations of the 3D vertices, and the normal vectors of each of the triangles (as shown in FIG. 15).

FIG. 3 is a detailed description of block 102. In block S1021, the determining module 220 determines an area of the curved surface according to the parametric equation of the curved surface. In block S1022, the determining module 220 determines theoretical step-lengths along the U direction and the V direction on the parameter plane, according to the designated number of vertices on the curved surface and the area of the curved surface. For example, if "N" represents the designated number of vertices on the curved surface, and "S" represents the area of the curved surface, then "Len. U0" and "Len. V0," which represent the theoretical step-lengths along the U direction and the V direction, can be determined via a formula Len. U0=Len. V0=sqrt (S/N).

In block S1023, the receiving module 210 receives a predetermined test step-length (i.e. Len.test) along the U direction and the V direction on the parameter plane. In block S1024, the obtaining module 230 picks 2D points along the U direction and the V direction on the parameter plane according to the test step-length. In one particular example, a 2D point A on the parameter plane may be picked arbitrarily. Then, a second 2D point B along the U direction may be picked, and a third 2D point C along the V direction maybe picked by adding the test step-length "Len.test" to U, V coordinates of the arbitrary point A respectively. In block S1025, the obtaining module 230 obtains 3D points that correspond to the 2D points along the U direction and the V direction respectively, such as 3D points A1, B1 and C1 that correspond to the 2D points A, B and C respectively.

In block S1026, the determining module 220 determines a distance between two 3D points that corresponds to the 2D points along the U direction and a distance between two 3D points that corresponds to the 2D points along the V direction respectively, such as a distance D1 between the 3D points A1 and B1, and a distance D2 between the 3D points A1 and C1.

In block S1027, the determining module 220 determines a first proportion (i.e. Ru) of a distance between two 2D points along the U direction to the distance between the two corresponding 3D points, and a second proportion (i.e. Rv) of a distance between two 2D points along the V direction to the distance between the two corresponding 3D points, according to the theoretical step-length and test step-lengths along the U direction and the V direction. For example, Ru=Len.test/D1, Rv=Len.test/D2. In this embodiment, as an example, we only give one point along the U direction, and one point along the V direction. It is noted that the more points picked along the U, V directions, the more precise the proportions would be when applying an average value method.

In block S1028, the determining module 220 determines effective step-lengths along the U direction and the V direction for dividing the minimal bounding box of the maximal planar loop, according to the proportions and the test step-length. For example, "Len. U" and "Len. V," which represents the effective step-lengths along the U direction and the V direction respectively, can be determined via following formulas: Len. U=Len. U0*Ru and Len.V=Len.V0*Rv respectively.

FIG. 4 is a detailed description of block 104. In block S1041, the obtaining module 230 obtains all loops on the curved surface. In block S1042, the obtaining module 230 obtains the perimeter of each of the loops. In block S1043, the obtaining module 230 obtains a minimal value of the effective step-length along the U direction and the effective step-length along the V direction. For example, if Len. U<Len. V, Len. U is obtained as the minimal value. In block S1044, the determining module 220 determines the number of the vertices on each of the loops according to the perimeter of the loop and the minimal value, if a perimeter of a loop is "L", then a number "n" of the vertices on the loop is determined via a formula n=L/Len.U. In block S1045, the obtaining module 230 obtains U, V coordinates of the vertices according to a parametric equation of each of the loops and the number of vertices on each of the loops.

Figure 5:
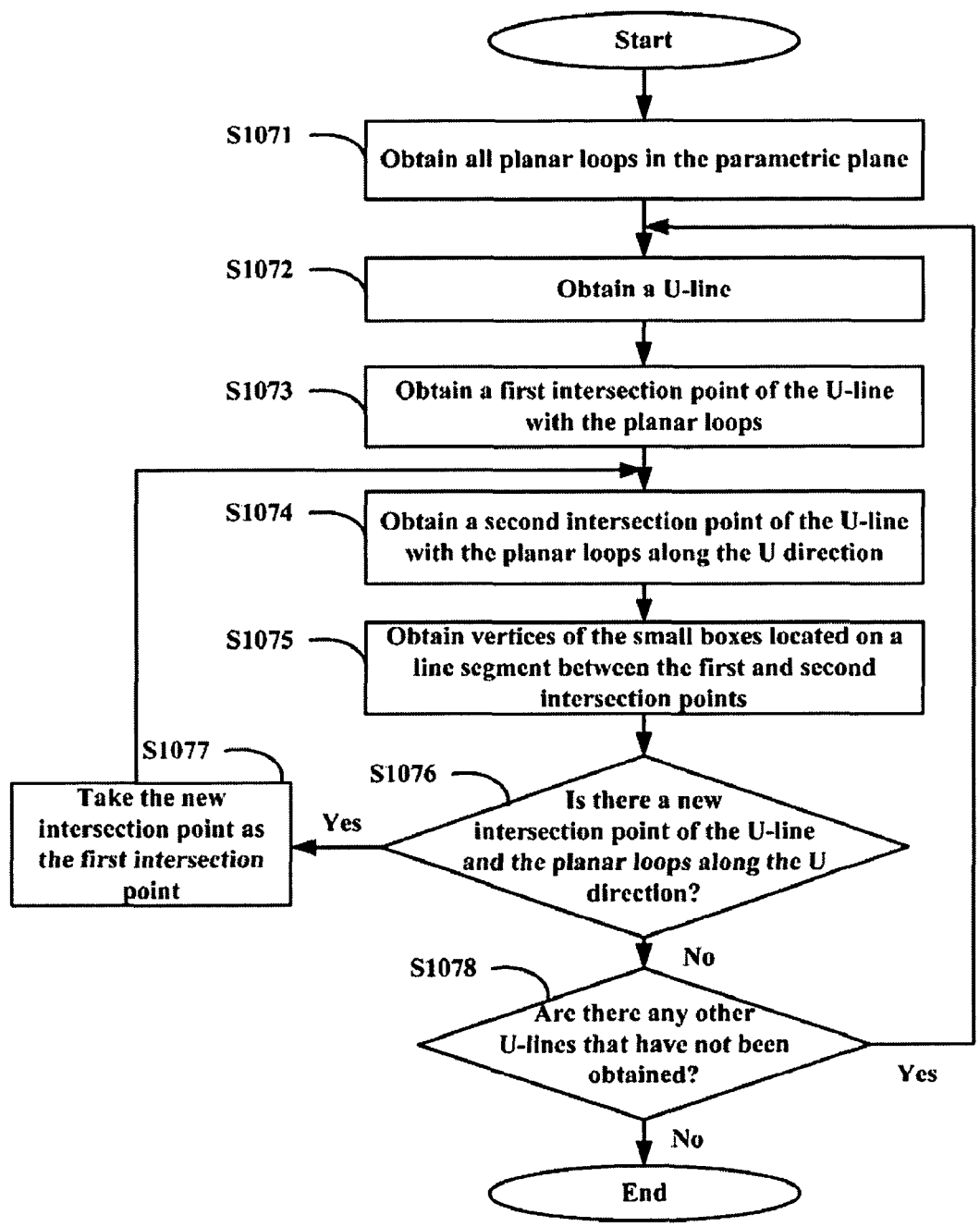
FIG. 5 is a detailed description of another block in FIG. 1, namely determining intersection points of the U/V-lines and the planar loops.

FIG. 5 is detailed description of determining intersection points of the U/V-lines and the planar loops in block S107. In block S1071, the obtaining module 230 obtains all planar loops on the parameter plane (i.e. loop 0, loop 1, loop 2 and loop 3 as shown in FIG. 8). In block S1072, the obtaining module 230 obtains a U-line on the parameter plane. In block S1073, the obtaining module 230 obtains a first intersection point of the U-line and the planar loops. In block S1074, the obtaining module 230 obtains a second intersection point of the U-line and the planar loops along the U direction. In block S1075, the obtaining module 230 obtains the vertices of the small boxes located on a line segment between the first and second intersection points, these vertices are called the "interior points".

In block S1076, the obtaining module 230 determines if there is a new intersection point of the U-line and the planar loops along the U direction. If there is a new intersection point, in block S1077, the obtaining module 230 takes the new intersection point as the first intersection point and the procedure returns to block S1074. Otherwise, in block S1076, if there is no new intersection point of the U-line and the planar loops along the U direction, the procedure goes to block S1078, the obtaining module 230 determines if there are any other U-lines that have not been obtained. If there are any other U-lines that have not been obtained, the procedure returns to block S1072 until all U-lines on the parameter plane have been obtained. It is noted that the procedure shown in FIG. 5 is also applicable to determine the intersection points of the V-lines and the planar loops, so no more detailed description is given here.

Figure 6:
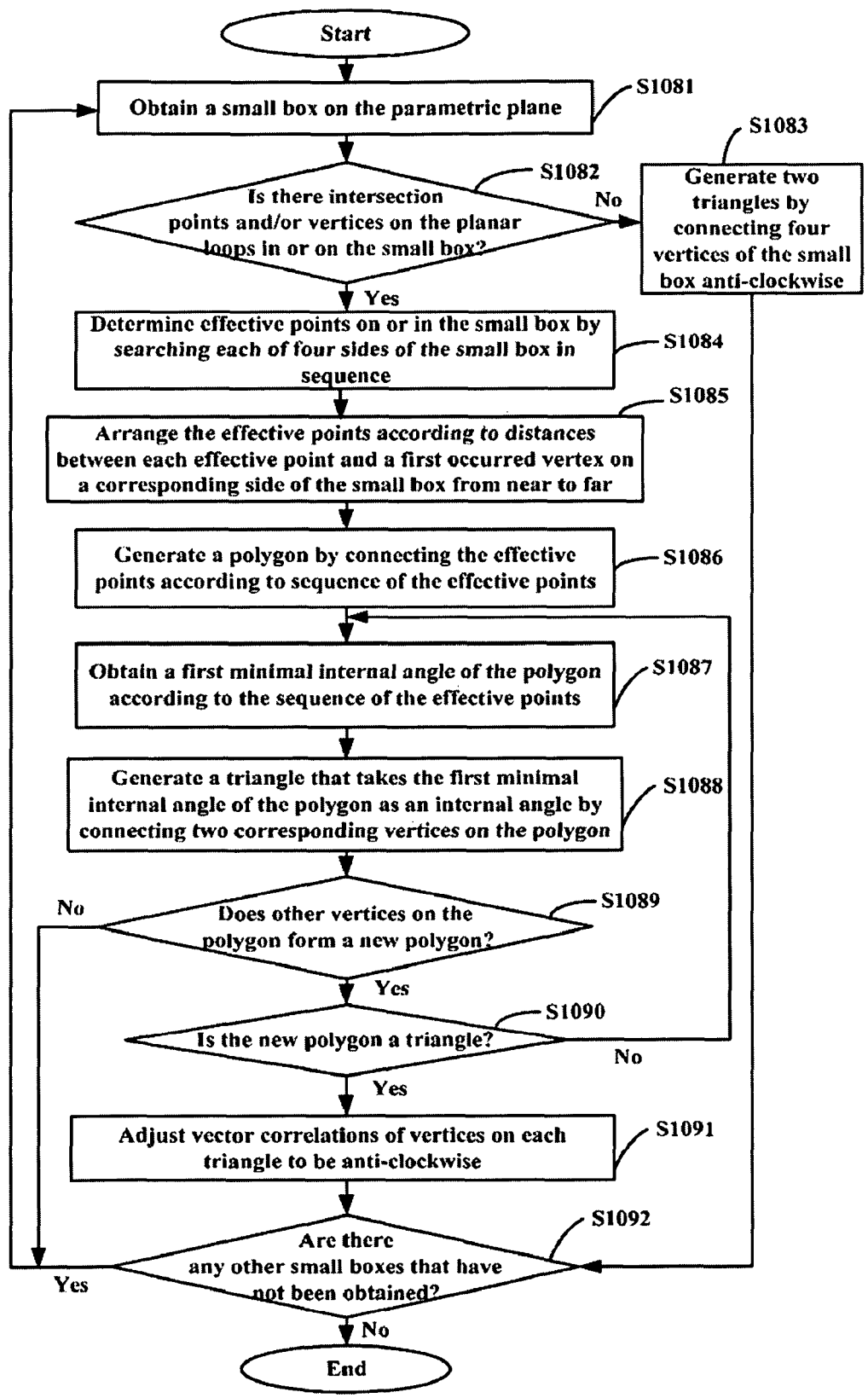
FIG. 6 is a detailed description of another block in FIG. 1, namely obtaining triangles by connecting extracted points in or on each small box, and adjust vector correlations of vertices on the triangle to be anti-clockwise.
Figure 11:
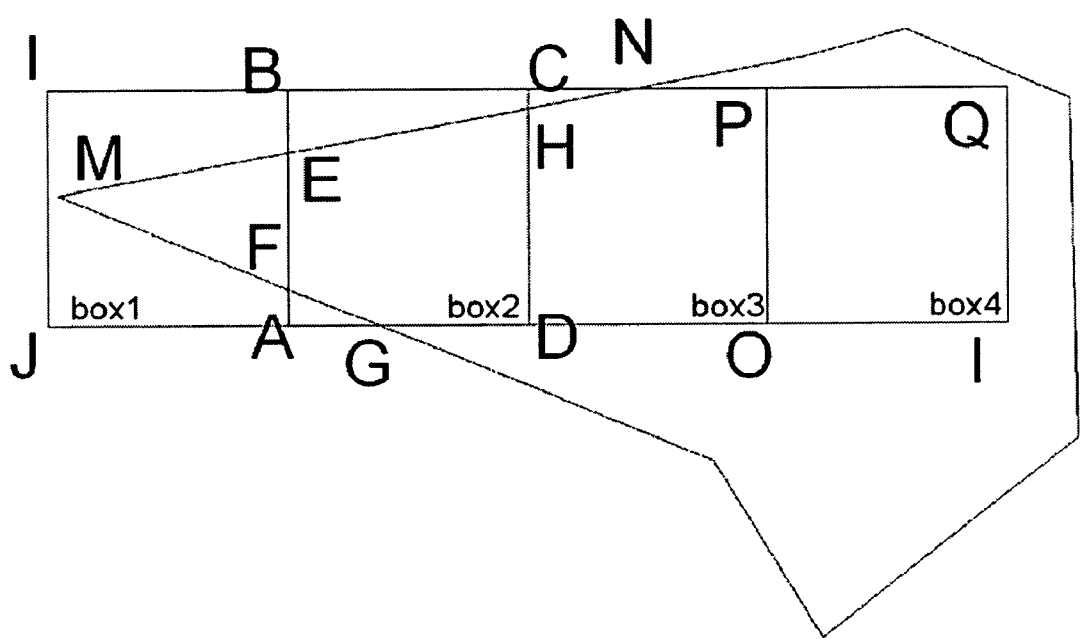
FIG. 11 and FIG. 12 illustrate generating triangles by connecting the extracted effective points in each small box on the parameter plane.
Figure 12:
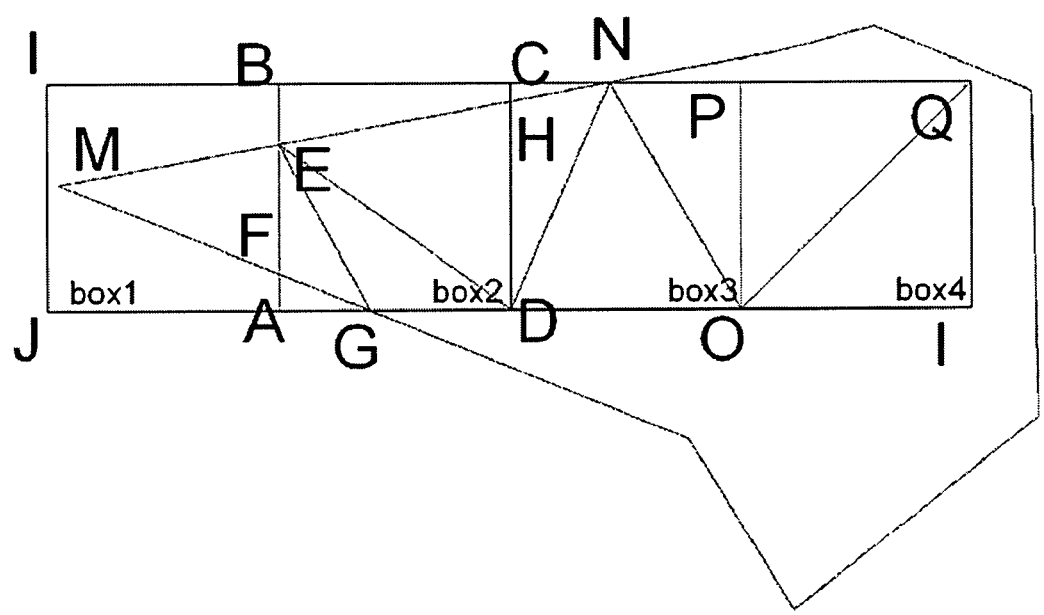

FIG. 6 is a detailed description of block 108. In block 1081, the obtaining module 230 obtains a small box on the parameter plane. In block S1082, the obtaining module 230 determines if there is one or more intersection points and/or vertices on the planar loops in the small box. If there are no intersection points and/or vertices on the planar loops, which represents that four vertices of the small box are all located among the planar loops, the procedure goes to block S1083, the meshing module 240 generates two triangles by connecting the four vertices on the small box anti-clockwise. For example, vertices P, Q, I and O of a box 4, are all located among planar loops in FIG. 11. In FIG. 12, the vertices P, Q, I and O of the box 4 are connected anti-clockwise to form two triangles ΔOQP and ΔOIQ. Then the procedure goes to block S1092, the obtaining module 230 determines if there are any other small boxes that have not been obtained. If there are any other small boxes that have not been obtained, the procedure returns to block S1081.

In block S1082, if there are intersection points and/or vertices on the planar loops in the small box, the procedure goes to block S1084, the obtaining module 230 extracts the effective points, including the intersection points, the vertices on the planar loops, and the interior points, on or in the small box by searching each of four sides of the small box in sequence. For example, as shown in FIG. 11, a searching sequence of sides of box1 is "JI", "IB", "BA", "AJ," there are no intersection points on sides "JI", "IB" and "AJ" of a box 1, there are two intersection points E, F on one side "BA," and there is a vertex M of a loop in the box1, then the effective points M, E, F in box 1 are extracted. In a similar way, the effective points F, E, H, D, G in a box 2, and D, H, N, P, O in a box 3 are extracted.

In block S1085, the meshing module 240 arranges the effective points according to distances between each effective point and a first occurring vertex on a corresponding side of the small box from near to far. For example, the searching sequence of sides of box 1 is "JI", "IB", "BA", "AJ," a vertex B is the first occurring vertex on the side "BA," a distance between the effective point E and the first occurring vertex B is |BE|, a distance between the effective point F and the first occurring vertex B is |BF|, |BE|<|BF|, therefore, a sequence of the effective points in box 1 is "M, E, F." Similarly, a sequence of the effective points in box 2 is "F, E, H, D, G" and a sequence of the effective points in box 3 is "D, H, N, P, O" are found.

In block S1086, the meshing module 230 generates a polygon by connecting the effective points according to the sequence of the effective points. For example, the meshing module 230 generates polygons MEF, FEHDG and DHNPO by connecting the effective points in box1, box2 and box3 according to the sequences respectively. In block S1087, the obtaining 130 obtains a first minimal internal angle of the polygon according to the sequence of the effective points. For example, the obtaining 130 obtains a first minimal internal angle ∠FME of the polygon MEF according to the sequence "M, E, F", a first minimal internal angle ∠EHD of the polygon FEHDG according to the sequence "F, E, H, D, G", and a first minimal internal angle ∠NPO of the polygon DHNPO according to the sequence "D, H, N, P, O."

In block S1088, the meshing module 240 generates a triangle that takes the first minimal internal angle of the polygon as an internal angle by connecting two corresponding vertices on the polygon. For example, the meshing module 240 generates a triangle ΔMEF by connecting vertices E and F, generates a triangle ΔEHD by connecting vertices E and D of the polygon FEHDG, and generates a triangle ΔNPO by connecting vertices N and O of the polygon DHNPO.

In block S1089, the obtaining module 230 determines if vertices apart from the vertex of the minimal internal angle of the polygon form a new polygon. If the vertices apart from the vertex of the minimal internal angle of the polygon do not form a new polygon, i.e. vertices E and F do not form a new polygon, the procedure goes to block S1092 as described above.

Otherwise, if in block S1089, the vertices apart from the vertex of the minimal internal angle of the polygon form a new polygon (i.e. vertices E, D, G, and F form a new polygon EDGF, vertices H, N, O, and D form a new polygon HNOD), the procedure goes to block S1090, the obtaining module 230 determines if the new polygon is a triangle. If the new polygon is not a triangle (i.e., the new polygon EDGF and HNOD are not triangles), the procedure repeats from block S1087 to block S1090 until a new polygon is a triangle. In block S1091, the meshing module 240 adjusts vector correlations of vertices on each triangle to be anti-clockwise, then the procedure goes to block S1092. FIG. 13 and FIG. 14 illustrate triangles generated by connecting the effective points on the parameter plane. FIG. 15 illustrates a well-proportioned triangulated 3D model of the curved surface in FIG. 7 by mapping all the triangles on the parameter plane shown in FIG. 14 to a 3D coordinate system.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented curved surface meshing method being executed by a processor of a computer, the method comprising:
   (a) receiving a parametric equation of a curved surface of an object from a database, wherein the curved surface comprises a plurality of loops;
   (b) receiving a designated number of vertices on the curved surface after triangulation of the curved surface of the object;
   (c) determining step-lengths along a horizontal direction and a vertical direction on a parameter plane of the curved surface according to the parametric equation of the curved surface and the designated number, comprising:
      (c1) determining an area of the curved surface according to the parametric equation of the curved surface;
      (c2) determining theoretical step-lengths along the horizontal direction and the vertical direction on the parameter plane, according to the designated number of the vertices there should be on the curved surface and the area of the curved surface;
      (c3) receiving a predetermined test step-length along the horizontal direction and the vertical direction on the parameter plane;
      (c4) picking 2D points along the horizontal direction and the vertical direction on the parameter plane based on the test step-length;
      (c5) mapping the 2D points to 3D points respectively;
      (c6) determining a distance between each two 3D points that corresponds to the 2D points along the horizontal direction and a distance between each two 3D points that corresponds to the 2D points along the vertical direction respectively;
      (c7) determining a first proportion of the distance between each two 2D points along the horizontal direction to the distance between each two corresponding 3D points, and a second proportion of the distance between each two 2D points along the vertical direction to the distance between each two corresponding 3D points, according to the theoretical step-length and test step-lengths along the horizontal direction and the vertical direction; and
      (c8) determining effective step-lengths along the horizontal direction and the vertical direction for dividing the bounding box of the maximal planar loop, according to the first proportion, the second proportion and the test step-length;
   (d) determining a perimeter of each loop on the curved surface according to a parametric equation of each of the loops according to the parametric equation of the curved surface;
   (e) determining a number of vertices on each loop, horizontal and vertical coordinates of the vertices, according to the parametric equation of the curved surface and the step-lengths;
   (f) generating a planar loop corresponding to each loop on the curved surface by connecting the vertices on the parameter plane;
   (g) dividing a minimal bounding box of a maximal planar loop into a plurality of small boxes by horizontal lines and vertical lines, according to the step-lengths;
   (h) determining intersection points of the horizontal lines or the vertical lines and the planar loops, vertices on the planar loops and vertices on the small boxes located among the planar loops, and using the intersection points and vertices as effective points;
   (i) generating triangles by connecting the effective points in or on each small box, and adjusting vector correlations of vertices on the triangle to be anti-clockwise;
   (j) mapping the vertices on the triangles having horizontal and vertical coordinates to three-dimensional (3D) vertices having X,Y,Z coordinates, according to the parametric equation of the curved surface;
   (k) determining normal vectors of each of the triangles according to the X,Y,Z coordinates of the 3D vertices on each of the triangles; and
   (l) outputting a triangulated curved surface to a display device according to the X,Y,Z coordinates, the vector correlations of the 3D vertices, and the normal vectors of each of the triangles.

2. The method as claimed in claim 1, wherein the block (e) comprises:
   (e1) obtaining all loops on the curved surface;
   (e2) obtaining the perimeter of each of the loops;
   (e3) obtaining a minimal value of the effective step-lengths along the horizontal direction and the effective step-length along the vertical direction;
   (e4) determining the number of vertices on each of the loops according to the perimeter of the loop and the minimal value; and (e5) obtaining horizontal and vertical coordinates of the vertices, according to a parametric equation of each of the loops and the number of vertices on each of the loops.

3. The method as claimed in claim 1, wherein determining vertices on the small boxes located among planar loops in block (h) comprises:
(h1) obtaining all planar loops on the parameter plane;
(h2) obtaining a horizontal line or a vertical line;
(h3) obtaining a first intersection point of the horizontal line or the vertical line with the planar loops;
(h4) obtaining a second intersection point of the horizontal line or the vertical line with the planar loops along the horizontal direction or the vertical direction;
(h5) obtaining vertices of the small boxes located on a line segment between the first intersection point and the second intersection point;
(h6) determining if there is another intersection point of the horizontal line or the vertical line and the planar loops along the horizontal direction or the vertical direction;
(h7) determining if there are any other horizontal lines that have not been obtained, on condition that there is not another intersection point of the horizontal line or the vertical line and the planar loops along the horizontal direction or the vertical direction; and
(h8) repeating block (h2) to block (h6), upon condition that there is one or more horizontal lines that have not been obtained.

4. The method as claimed in claim 3, wherein block (h) further comprises:
(h61) taking the another intersection point as the first intersection point; and
(h62) repeating from block (h4) to block (h6).

5. The method as claimed in claim 1, wherein block (i) comprises:
(i1) obtaining a small box on the parameter plane;
(i2) determining if there is one or more intersection points and/or vertices on the planar loops in the small box;
(i3) determining effective points on sides of or in the small box by searching each of four sides of the small box in sequence;
(i4) arranging the effective points according to a distance between each effective point and a first occurring vertex on a corresponding side of the small box from near to far;
(i5) generating a polygon by connecting the effective points according to a sequence of the effective points;
(i6) obtaining a first minimal internal angle of the polygon according to the sequence of the effective points;
(i7) generating a triangle that takes the first minimal internal angle of the polygon as an internal angle by connecting two corresponding vertices on the polygon;
(i8) determining if vertices apart from the vertex of the minimal internal angle of the polygon form a new polygon;
(i9) determining if the new polygon is a triangle, on condition that vertices apart from the vertex of the minimal internal angle of the polygon form a new polygon;
(i10) adjusting vector correlations of vertices on each triangle to be anti-clockwise, on condition that the new polygon is a triangle;
(i11) determining if there are any other small boxes that have not been obtained; and. (i12) repeating block (i1) to block (i11), upon condition that there are any other small boxes that have not been obtained.

6. The method as claimed in claim 5, wherein block (i) further comprises:

(i13) generating two triangles by connecting four vertices of the small box anti-clockwise, on condition that there are no intersection points and/or vertices on the planar loops in the small box; and
(i14) going to block (i11).

7. The method as claimed in claim 5, wherein block (i) further comprises:
(i15) repeating block (i11), upon condition that vertices apart from the vertex of the minimal internal angle of the polygon do not form a new polygon.

8. The method as claimed in claim 5, wherein block (i) further comprises:
(i16) repeating from block (i6), upon condition that the new polygon is not a triangle.

9. A non-transitory computer-readable medium having stored thereon instructions for meshing a curved surface, the instructions performing blocks comprising:
(a) receiving a parametric equation of a curved surface of an object from a database;
(b) receiving a designated number of vertices there should be on the curved surface after triangulation;
(c) determining step-lengths along a horizontal direction and a vertical direction on a parameter plane according to the parametric equation of the curved surface and the designated number, comprising:
(c1) determining an area of the curved surface according to the parametric equation of the curved surface;
(c2) determining theoretical step-lengths along the horizontal direction and the vertical direction on the parameter plane, according to the designated number of the vertices there should be on the curved surface and the area of the curved surface;
(c3) receiving a predetermined test step-length along the horizontal direction and the vertical direction on the parameter plane;
(c4) picking 2D points along the horizontal direction and the vertical direction on the parameter plane based on the test step-length;
(c5) mapping the 2D points to 3D points respectively;
(c6) determining a distance between each two 3D points that corresponds to the 2D points along the horizontal direction and a distance between each two 3D points that corresponds to the 2D points along the vertical direction respectively;
(c7) determining a first proportion of the distance between each two 2D points along the horizontal direction to the distance between each two corresponding 3D points, and a second proportion of the distance between each two 2D points along the vertical direction to the distance between each two corresponding 3D points, according to the theoretical step-length and test step-lengths along the horizontal direction and the vertical direction; and
(c8) determining effective step-lengths along the horizontal direction and the vertical direction for dividing the bounding box of the maximal planar loop, according to the first proportion, the second proportion and the test step-length;
(d) determining a perimeter of each loop on the curved surface according to a parametric equation of the loop according to the parametric equation of the curved surface;
(e) determining a number of vertices on each loop, horizontal and vertical coordinates of the vertices, according to the parametric equation of the curved surface and the step-lengths;

(f) generating a planar loop corresponding to each loop on the curved surface by connecting the vertices on the parameter plane;

(g) dividing a minimal bounding box of a maximal planar loop into a plurality of small boxes by horizontal lines and vertical lines, according to the step-lengths;

(h) determining intersection points of the horizontal lines or the vertical lines and the planar loops, vertices on the planar loops and vertices on the small boxes located among the planar loops, and taking the intersection points and vertices as effective points;

(i) generating triangles by connecting the effective points in or on each small box, and adjusting vector correlations of vertices on the triangle to be anti-clockwise;

(j) mapping the vertices on the triangles having horizontal and vertical coordinates to three-dimensional (3D) vertices having X,Y,Z coordinates, according to the parametric equation of the curved surface;

(k) determining normal vectors of each of the triangles according to the X,Y,Z coordinates of the 3D vertices on each of the triangles; and (l) outputting a triangulated curved surface via a display device according to the X,Y,Z coordinates, the vector correlations of the 3D vertices, and the normal vectors of each of the triangles.

10. The non-transitory computer-readable medium as claimed in claim 9, wherein block (e) comprises:
   (e1) obtaining all loops on the curved surface;
   (e2) obtaining the perimeter of each of the loops;
   (e3) obtaining a minimal value of the effective step-lengths along the horizontal direction and the effective step-length along the vertical direction;
   (e4) determining the number of vertices on each of the loops according to the perimeter of the loop and the minimal value; and
   (e5) obtaining horizontal and vertical coordinates of the vertices, according to a parametric equation of each of the loops and the number of vertices on each of the loops.

11. The non-transitory computer-readable medium as claimed in claim 9, wherein determining vertices on the small boxes located among planar loops in block (h) comprises:
   (h1) obtaining all planar loops on the parameter plane;
   (h2) obtaining a horizontal line or a vertical line;
   (h3) obtaining a first intersection point of the horizontal line or the vertical line with the planar loops;
   (h4) obtaining a second intersection point of the horizontal line or the vertical line with the planar loops along the horizontal direction or the vertical direction;
   (h5) obtaining vertices of the small boxes located on a line segment between the first intersection point and the second intersection point;
   (h6) determining if there is another intersection point of the horizontal line or the vertical line and the planar loops along the horizontal direction or the vertical direction;
   (h7) determining if there are any other horizontal lines that have not been obtained, on condition that there is not another intersection point of the horizontal line or the vertical line and the planar loops along the horizontal direction or the vertical direction; and
   (h8) repeating block (h2) to block (h6), upon condition that there is one or more horizontal lines that have not been obtained.

12. The non-transitory computer-readable medium as claimed in claim 11, wherein block (h) further comprises:
   (h61) taking the another intersection point as the first intersection point; and
   (h62) repeating block (h4) to block (h6).

13. The non-transitory computer-readable medium as claimed in claim 9, wherein block (i) comprises:
   (i1) obtaining a small box on the parameter plane;
   (i2) determining if there is one or more intersection points and/or vertices on the planar loops in the small box;
   (i3) determining effective points on sides of or in the small box by searching each of four sides of the small box in sequence;
   (i4) arranging the effective points according to a distance between each effective point and a first occurring vertex on a corresponding side of the small box from near to far;
   (i5) generating a polygon by connecting the effective points according to a sequence of the effective points;
   (i6) obtaining a first minimal internal angle of the polygon according to the sequence of the effective points;
   (i7) generating a triangle that takes the first minimal internal angle of the polygon as an internal angle by connecting two corresponding vertices on the polygon;
   (i8) determining if vertices apart from the vertex of the minimal internal angle of the polygon form a new polygon;
   (i9) determining if the new polygon is a triangle, on condition that vertices apart from the vertex of the minimal internal angle of the polygon form a new polygon;
   (i10) adjusting vector correlations of vertices on each triangle to be anti-clockwise, on condition that the new polygon is a triangle;
   (i11) determining if there are any other small boxes that have not been obtained; and. (i12) repeating block (i1) to block (i11), on condition that there are any other small boxes that have not been obtained.

14. The non-transitory computer-readable medium as claimed in claim 13, wherein the block (i) further comprises:
   (i13) generating two triangles by connecting four vertices of the small box anti-clockwise, on condition that there are no intersection points and/or vertices on the planar loops in the small box; and
   (i14) going to block (i11).

15. The non-transitory computer-readable medium as claimed in claim 13, wherein block (i) further comprises:
   (i15) going to block (i11), on condition that vertices apart from the vertex of the minimal internal angle of the polygon do not form a new polygon.

16. The non-transitory computer-readable medium as claimed in claim 13, wherein block (i) further comprises:
   (i16) repeating from block (i6), on condition that the new polygon is not a triangle.

* * * * *